United States Patent [19]

Hogge et al.

[11] Patent Number: 5,849,137

[45] Date of Patent: Dec. 15, 1998

[54] CONTINUOUS PROCESS AND APPARATUS FOR MANUFACTURING CONDUCTIVE POLYMER COMPONENTS

[75] Inventors: Steven Darryl Hogge, Corona, Calif.; Mengruo Zhang, Taikoo Shing; Sidharta Wiryana, Kowloon, both of Hong Kong

[73] Assignee: Bourns Multifuse (Hong Kong) Ltd., Kowloon Bay, Hong Kong

[21] Appl. No.: 828,452

[22] Filed: Mar. 28, 1997

Related U.S. Application Data

[62] Division of Ser. No. 515,506, Aug. 15, 1995, abandoned.

[51] Int. Cl.$^6$ .............................. B29C 47/06; B29C 47/92
[52] U.S. Cl. .......................... 156/500; 156/358; 156/360; 425/141; 425/145
[58] Field of Search ............................... 156/500, 244.27, 156/244.24, 244.22, 244.11, 351, 358, 360; 425/141, 145, 204, 114, 377

[56] References Cited

U.S. PATENT DOCUMENTS

| | | |
|---|---|---|
| 2,861,163 | 11/1958 | Asakawa . |
| 2,978,665 | 4/1961 | Vernet et al. . |
| 3,061,501 | 10/1962 | Dittman et al. . |
| 3,138,686 | 6/1964 | Mitoff et al. . |
| 3,187,164 | 6/1965 | Andrich . |

(List continued on next page.)

FOREIGN PATENT DOCUMENTS

| | | |
|---|---|---|
| 0158410 | 10/1985 | European Pat. Off. . |
| 0311142 | 12/1989 | European Pat. Off. . |
| 2838508 | 3/1980 | Germany . |
| 62-240526 | 10/1987 | Japan . |
| 64-47534 | 2/1989 | Japan . |
| 1167551 | 10/1959 | United Kingdom . |
| 1172718 | 12/1969 | United Kingdom . |
| 1458720 | 12/1976 | United Kingdom . |
| 1561355 | 2/1980 | United Kingdom . |
| 1604735 | 12/1981 | United Kingdom . |

OTHER PUBLICATIONS

Japanese Patent Application No. 49–82736, Aug. 9, 1974.
Saburi, O. "Proscessing Techniques and Applications of Positive Temperature Coefficient Thermistors", *IEEE Transactions on Component Parts*, pp. 53–67(1963).

(List continued on next page.)

*Primary Examiner*—Daniel Stemmer
*Attorney, Agent, or Firm*—Klein & Szekeres

[57] ABSTRACT

A direct extrusion process for manufacturing conductive polymer articles of manufacture employs a twin screw compounding extruder that compounds a polymeric mixture from materials received, in predetermined proportions, from gravimetric feeders, then extrudes a compounded conductive polymeric material in the melt phase. The extrudate is then fed into a gear pump that allows the extruder to discharge the compounded material, while it is still in the melt stage, at a relatively low pressure. The gear pump produces a substantially constant volumetric output of the compounded "melt phase" material at sufficiently high pressure for delivery into a sheet die. The sheet die forms the compounded material, while still in the melt phase, into a continuous web. The formed polymeric web, while at a temperature just below the melt temperature of the polymeric material, is fed into a mechanism that laminates a continuous web of conductive metal foil onto each side of the polymeric web, the foil webs being pre-heated to a temperature slightly above the melt temperature of the polymeric material. The continuous web of laminate may then be cut into measured lengths, prior to stamping or punching out the individual components. Uniformity in the conductive polymeric extrudate may be enhanced by controlling the extruder and the feeders through a feedback system using the pump inlet pressure as the control parameter. The thickness of the laminated web may be maintained within desired tolerances by closed loop feedback control of the sheet die and/or the laminating mechanism.

10 Claims, 3 Drawing Sheets

U.S. PATENT DOCUMENTS

| | | |
|---|---|---|
| 3,243,753 | 3/1966 | Kohler . |
| 3,351,882 | 11/1967 | Kohler et al. . |
| 3,571,777 | 3/1971 | Tully et al. . |
| 3,592,710 | 7/1971 | Yurgen ............................. 156/244.27 |
| 3,619,560 | 11/1971 | Buiting et al. . |
| 3,654,533 | 4/1972 | della Porta et al. .................... 317/258 |
| 3,673,121 | 6/1972 | Meyer . |
| 3,689,736 | 9/1972 | Meyer . |
| 3,745,507 | 7/1973 | Ishida et al. . |
| 3,760,495 | 9/1973 | Meyer . |
| 3,823,217 | 7/1974 | Kampe . |
| 3,824,328 | 7/1974 | Ting et al. . |
| 3,858,144 | 12/1974 | Bedard et al. . |
| 3,861,029 | 1/1975 | Smith-Johannsen et al. . |
| 3,914,363 | 10/1975 | Bedard et al. . |
| 3,976,600 | 8/1976 | Meyr . |
| 4,101,862 | 7/1978 | Takagi et al. . |
| 4,151,126 | 4/1979 | Adelman et al. . |
| 4,151,401 | 4/1979 | Van Bokestal et al. . |
| 4,171,193 | 10/1979 | Rahlfs ..................................... 425/377 |
| 4,177,376 | 12/1979 | Horsma et al. . |
| 4,177,446 | 12/1979 | Diaz . |
| 4,237,441 | 12/1980 | van Konynenberg et al. . |
| 4,238,812 | 12/1980 | Middleman et al. . |
| 4,246,468 | 1/1981 | Horsma . |
| 4,250,398 | 2/1981 | Ellis et al. . |
| 4,255,698 | 3/1981 | Simon . |
| 4,272,471 | 6/1981 | Walker ................................... 264/104 |
| 4,313,996 | 2/1982 | Newman ............................ 156/244.27 |
| 4,314,230 | 2/1982 | Cardinal et al. . |
| 4,314,231 | 2/1982 | Walty . |
| 4,315,237 | 2/1982 | Middleman et al. . |
| 4,317,027 | 2/1982 | Middleman et al. . |
| 4,327,351 | 4/1982 | Walker ................................ 338/22 R |
| 4,329,726 | 5/1982 | Middleman et al. . |
| 4,341,949 | 7/1982 | Steiner et al. . |
| 4,348,584 | 9/1982 | Gale et al. . |
| 4,352,083 | 9/1982 | Middleman et al. . |
| 4,388,607 | 6/1983 | Toy et al. . |
| 4,413,301 | 11/1983 | Middleman et al. . |
| 4,426,339 | 1/1984 | Kamath et al. ........................... 264/22 |
| 4,426,633 | 1/1984 | Taylor . |
| 4,431,598 | 2/1984 | Korpman ............................... 264/40.7 |
| 4,439,918 | 4/1984 | Carroll, II et al. . |
| 4,444,708 | 4/1984 | Gale et al. . |
| 4,445,026 | 4/1984 | Walker . |
| 4,454,084 | 6/1984 | Smith ..................................... 264/40.1 |
| 4,475,138 | 10/1984 | Middleman et al. . |
| 4,478,775 | 10/1984 | Endo ...................................... 264/40.1 |
| 4,481,498 | 11/1984 | McTavish et al. . |
| 4,490,218 | 12/1984 | Kadija et al. ............................. 204/13 |
| 4,521,265 | 6/1985 | Kunihiko ................................ 156/324 |
| 4,534,889 | 8/1985 | van Konynenberg et al. . |
| 4,542,365 | 9/1985 | McTavish et al. . |
| 4,545,926 | 10/1985 | Fouts, Jr. et al. . |
| 4,560,498 | 12/1985 | Horsma et al. . |
| 4,639,818 | 1/1987 | Cherian . |
| 4,647,894 | 3/1987 | Ratell . |
| 4,647,896 | 3/1987 | Ratell . |
| 4,652,325 | 3/1987 | Benge ............................... 156/244.11 |
| 4,654,511 | 3/1987 | Horsma et al. . |
| 4,685,025 | 8/1987 | Carlomagno . |
| 4,689,475 | 8/1987 | Kleiner et al. .......................... 219/553 |
| 4,698,614 | 10/1987 | Welch et al. . |
| 4,732,701 | 3/1988 | Nishii et al. . |
| 4,752,762 | 6/1988 | Inano et al. . |
| 4,755,246 | 7/1988 | Monio ............................... 156/244.11 |
| 4,769,901 | 9/1988 | Nagahori ................................ 29/621 |
| 4,774,024 | 9/1988 | Deep et al. . |
| 4,787,135 | 11/1988 | Nagahori ................................ 29/612 |
| 4,800,253 | 1/1989 | Kleiner et al. .......................... 219/553 |
| 4,845,838 | 7/1989 | Jacobs et al. ............................ 29/671 |
| 4,849,133 | 7/1989 | Yoshida et al. . |
| 4,876,439 | 10/1989 | Nagahori ............................... 219/541 |
| 4,882,466 | 11/1989 | Friel . |
| 4,884,163 | 11/1989 | Deep et al. . |
| 4,904,850 | 2/1990 | Claypool et al. . |
| 4,907,340 | 3/1990 | Fang et al. ............................... 29/610 |
| 4,924,074 | 5/1990 | Fang et al. . |
| 4,942,286 | 7/1990 | Monter et al. . |
| 4,951,382 | 8/1990 | Jacobs et al. ............................ 29/611 |
| 4,951,384 | 8/1990 | Jacobs et al. ............................ 29/611 |
| 4,954,696 | 9/1990 | Ishil et al. . |
| 4,955,267 | 9/1990 | Jacobs et al. ............................ 29/611 |
| 4,959,505 | 9/1990 | Ott . |
| 4,967,176 | 10/1990 | Horsma et al. . |
| 4,980,541 | 12/1990 | Shafe et al. . |
| 4,983,944 | 1/1991 | Uchida et al. . |
| 5,015,824 | 5/1991 | Monter et al. . |
| 5,039,844 | 8/1991 | Nagahori . |
| 5,049,850 | 9/1991 | Evans . |
| 5,057,674 | 10/1991 | Smith-Johannsen . |
| 5,064,997 | 11/1991 | Fang et al. . |
| 5,089,688 | 2/1992 | Fang et al. . |
| 5,089,801 | 2/1992 | Chan et al. . |
| 5,140,297 | 8/1992 | Jacobs et al. .......................... 338/22 R |
| 5,142,267 | 8/1992 | Fellner et al. . |
| 5,148,005 | 9/1992 | Fang et al. . |
| 5,164,133 | 11/1992 | Ishida et al. . |
| 5,166,658 | 11/1992 | Fang et al. . |
| 5,171,774 | 12/1992 | Ueno et al. . |
| 5,173,362 | 12/1992 | Tekkanat et al. ....................... 428/283 |
| 5,174,924 | 12/1992 | Yamada et al. . |
| 5,178,797 | 1/1993 | Evans . |
| 5,181,006 | 1/1993 | Shafe et al. . |
| 5,190,697 | 3/1993 | Ohkita et al. . |
| 5,195,013 | 3/1993 | Jacobs et al. .......................... 361/106 |
| 5,210,517 | 5/1993 | Abe . |
| 5,212,466 | 5/1993 | Yamada et al. . |
| 5,213,737 | 5/1993 | Ford ...................................... 425/204 |
| 5,227,946 | 7/1993 | Jacobs et al. .......................... 361/106 |
| 5,241,741 | 9/1993 | Sugaya ................................... 29/612 |
| 5,247,277 | 9/1993 | Fang et al. . |
| 5,250,228 | 10/1993 | Baigrie et al. . |
| 5,280,263 | 1/1994 | Sugaya ............................... 338/22 R |
| 5,303,115 | 4/1994 | Nayar et al. . |
| 5,304,331 | 4/1994 | Leonard ................................ 425/377 |
| 5,358,793 | 10/1994 | Hanada et al. ......................... 428/560 |
| 5,372,765 | 12/1994 | Chen ..................................... 425/203 |
| 5,401,154 | 3/1995 | Sargent ................................. 425/114 |

OTHER PUBLICATIONS

Meyer, J. "Glass Transition Temperature as a Guide to Selection of Polymers Suitable for PTC Material", *Polymer Engineering And Science*, 13/6:462–468 (Nov., 1973).

Meyer, J. (1974) "Stability of polymer composites as positive–temperature–coefficient resistors" *Polymer Engineering and Science*, 14/10:706–716.

Arrowsmith, D.J. (1970) "Adhesion of Electroformed Copper and Nickel to Plastic Laminates", *Transactions of the Instituted of Metal Finishings*, vol. 48, pp. 88–92.

Bigg D. M. et al. "Conductive Polymeric Composites from Short Conductive Fibers", Batelle Columbus Laboratories, pp. 23–38.

CONTINUOUS PROCESS AND APPARATUS FOR MANUFACTURING CONDUCTIVE POLYMER COMPONENTS

CROSS-REFERENCE TO RELATED APPLICATION

This application is a divisional of application Ser. No. 08/515,506, filed on Aug. 15, 1995, now abandoned.

BACKGROUND OF THE INVENTION

The present invention relates broadly to the field of processes and methods for manufacturing conductive polymer components. More specifically, it relates to a continuous process, and the apparatus for carrying out that process, for manufacturing an article of manufacture conductive polymer components that comprise a conductive polymer layer laminated between a pair of conductive metallic foil layers that function as electrodes when the products are manufactured into electronic devices.

Electronic devices that include an element made from a conductive polymer have become increasingly popular, being used in a variety of applications. They have achieved widespread usage, for example, in overcurrent protection and self-regulating heater applications, in which a polymeric material having a positive temperature coefficient of resistance is employed. Examples of positive temperature coefficient (PTC) polymeric materials, and of devices incorporating such materials, are disclosed in the following U.S. patents:

U.S. Pat. No. 3,823,217 Kampe, U.S. Pat. No. 4,237,441 van Konynenburg, U.S. Pat. No. 4,238,812 Middleman et al. U.S. Pat. No. 4,317,027 Middleman et al. U.S. Pat. No. 4,329,726 Middleman et al. U.S. Pat. No. 4,413,301 Middleman et al. U.S. Pat. No. 4,426,633 Taylor U.S. Pat. No. 4,445,026 Walker U.S. Pat. No. 4,545,926 Fouts, Jr., et al. U.S. Pat. No. 4,774,024 Deep et al. U.S. Pat. No. 4,689,475 Kleiner et al. U.S. Pat. No. 4,732,701 Nishii et al. U.S. Pat. No. 4,769,901 Nagahori U.S. Pat. No. 4,787,135 Nagahori U.S. Pat. No. 4,800,253 Kleiner et al. U.S. Pat. No. 4,849,133 Yoshida et al. U.S. Pat. No. 4,876,439 Nagahori U.S. Pat. No. 4,884,163 Deep et al. U.S. Pat. No. 4,907,340 Fang et al. U.S. Pat. No. 4,951,382 Jacobs et al. U.S. Pat. No. 4,951,384 Jacobs et al. U.S. Pat. No. 4,955,267 Jacobs et al. U.S. Pat. No. 4,980,541 Shafe et al. U.S. Pat. No. 5,049,850 Evans U.S. Pat. No. 5,140,297 Jacobs et al. U.S. Pat. No. 5,171,774 Ueno et al. U.S. Pat. No. 5,174,924 Yamada et al. U.S. Pat. No. 5,178,797 Evans U.S. Pat. No. 5,181,006 Shafe et al. U.S. Pat. No. 5,190,697 Ohkita et al. U.S. Pat. No. 5,195,013 Jacobs et al. U.S. Pat. No. 5,227,946 Jacobs et al. U.S. Pat. No. 5,241,741 Sugaya U.S. Pat. No. 5,250,228 Baigrie et al. U.S. Pat. No. 5,280,263 Sugaya U.S. Pat. No. 5,358,793 Hanada et al.

The conductive polymer devices of the prior art are typically made in a batch process, in which a sheet of conductive polymer material is formed, and then laminated between sheets of conductive metal foil. The laminated assembly is then cut into individual electronic components. More specifically, the polymeric sheet is formed by batch mixing or compounding a polymer (e.g., high density polyethylene, or HDPE), a conductive filler such as carbon black or various metallic fillers, and other materials (e.g., other fillers and antioxidants), then forming a sheet of conductive polymer material, using either single screw extrusion or compression/injection molding.

Furthermore (as disclosed, for example, in U.S. Pat. No. 4,426,633 Taylor), the materials may be mixed, and, while heated, extruded through a pelletizing die and chopped to form pellets. The pellets are then vacuum-dried and extruded into a tape or sheet that is cut into pieces, each of which is laminated between a pair of foil sheets using a discrete, high temperature compression process, before finally being cut into the individual components.

It is of great importance, particularly in overcurrent protection applications, for the material to have a high degree of uniformity in such areas as volume resistivity, filler dispersion, process heat history, and degree of polymer cross-linking, in devices having the same nominal electrical performance specifications. A drawback to the batch processing of the prior art is that a relatively high degree of variability is introduced into the manufactured devices. This drawback stems from several sources.

First, there is the inherent variability in the batch mixing or compounding step of the process. Specifically, there is an inherent variability, on a batch-to batch basis, of material mix, set-up conditions, and process conditions. Furthermore, there is often an insufficient mixing of the materials, and the batch mixing process requires a secondary melt processing (such as single screw extrusion) to form the material into a usable shape. Some compensation for the batch-to-batch variability may be obtained by mixing together multiple master batches prior to the secondary melt processing, but the result is still a degree of variability in resistance in the final sheet, introduced by the typical use of a single screw extruder in the secondary melt processing. This variability, which may include non-normal distributions exhibiting multi-modal resistance peaks, is typically caused by non-uniform mixing of the master batches and the introduction of additional heat history to the material during the secondary melt process in the extruder. The resulting degree of variability may be unacceptable for many applications.

In addition, the batch mixing step produces compounded pellets that need to be stored in an environment in which temperature, humidity, and dust content are tightly controlled, to minimize the presence of impurities and moisture that need to be removed to avoid bubbles in the foil-polymer interface of the laminated final product.

Variations in both physical dimensions and resistance characteristics are also introduced in the batch lamination step of the manufacturing process, as a result of different temperatures, pressures, and gap spacings among the multiple lamination machines, as well as stroke-to-stroke variations on any given single machine.

Furthermore, each of the above-described discrete processes contributes an additional and different heat history to the product, degrading the base polymeric resin due to thermal oxidation from exposure to temperatures above the melting point of the polymer. This can result in excessive variances in the electrical performance characteristics of the finished product.

There has thus been a long-felt, but as yet unmet need for a process for manufacturing conductive polymer devices, particularly polymer PTC devices, that avoids the above-described disadvantages of the prior art batch process methods, while maintaining good uniformity of physical and electrical characteristics among devices with the same nominal specifications, and while keeping per unit manufacturing costs acceptably low.

SUMMARY OF THE INVENTION

Broadly, the present invention employs a continuous process known as "direct extrusion" in the manufacturing of polymer PTC devices. In direct extrusion, the steps of compounding materials of the mixture, extruding the polymeric mixture, and laminating the extruded material are performed serially in a continuous process, with closed-loop process control by a microprocessor.

More specifically, the present invention employs a twin screw compounding extruder that compounds the polymeric mixture from materials received, in predetermined proportions, from gravimetric feeders, then extrudes a compounded conductive polymeric material in the melt phase. The extrudate is then fed into a gear pump that allows the extruder to discharge the compounded material, while it is still in the melt stage, at a relatively low pressure, thereby minimizing or avoiding the introduction of unnecessary shear forces and work into the material. The gear pump then produces a substantially constant volumetric output of the compounded "melt phase" material at sufficiently high pressure for delivery into a sheet die. The sheet die forms the compounded material, while still in the melt phase, into a high tolerance continuous web. The formed polymeric web, while at a temperature just below the melt temperature of the polymeric material, is fed into a mechanism that laminates a continuous web of conductive metal foil onto each side of the polymeric web, the foil webs being pre-heated to a temperature slightly above the melt temperature of the polymeric material. The continuous web of laminate may then be cut into measured lengths, prior to stamping or punching out the individual components. Alternatively, the laminated web may be wound into a roll prior to the stamping or punching process.

This continuous process produces articles of manufacture, each comprising a formed polymeric layer sandwiched between metallic foil electrodes, suitable for fabrication into polymer PTC devices, that have undergone minimum heat history, and that have avoided the batch-to-batch variability in material thickness and resistivity inherent in the above-mentioned prior art batch processes. Furthermore, the polymer PTC devices manufactured from components produced by this method exhibit superior aging characteristics and voltage stability as compared with products made by the prior art processes.

These and other advantages of the invention will be more fully appreciated from the detailed description that follows.

DETAILED DESCRIPTION OF A PREFERRED EMBODIMENT

Referring now to the drawings, a continuous process for the manufacturing of conductive polymer devices, in accordance with a preferred embodiment of the invention, will be described in conjunction with a description of the apparatus used to carry out the process.

Figures 1, 2:
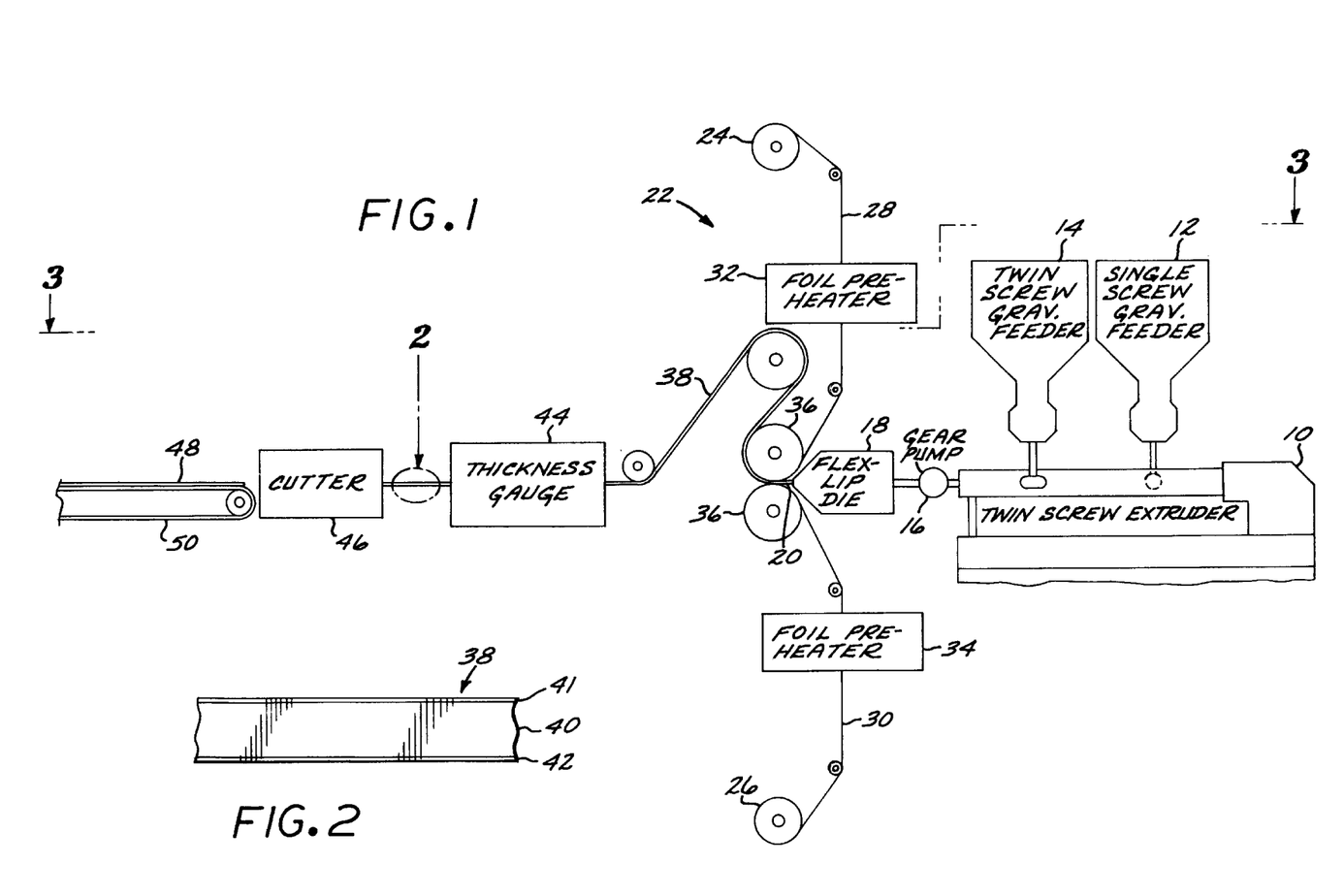
FIG. 1 is a semi-schematic, side elevational view of the apparatus used to carry out a continuous process for manufacturing a conductive polymer device, in accordance with a preferred embodiment of the present invention.
FIG. 2 is a detailed view of the laminated polymeric material produced by the apparatus of FIG. 1, as encompassed within the broken outline 2 in FIG. 1.
Figure 3:
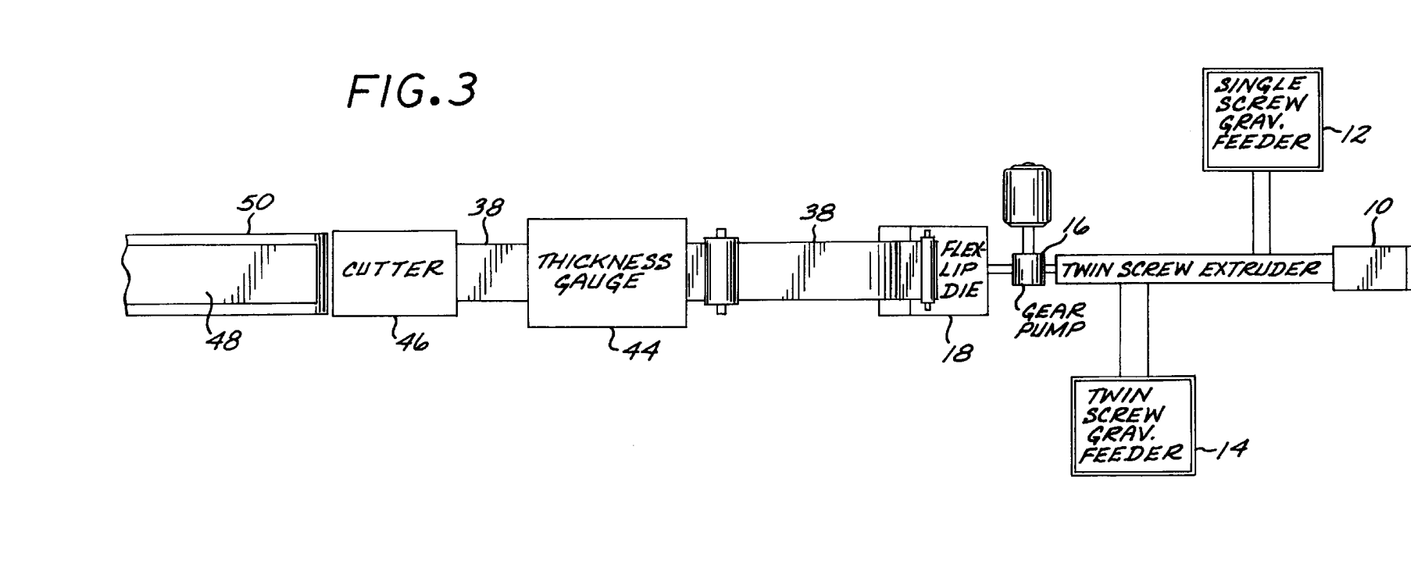
FIG. 3 is a top plan view of the apparatus of FIG. 1, taken along line 3—3 of FIG. 1.

The process begins with a compounding apparatus, comprising, in the preferred embodiment, a twin screw compounding extruder 10, such as the type available from American Leistritz Extruder Corporation, of Somerville, N.J., under the model designation "ZSE-27". The twin screw compounding extruder 10 includes dual extruder screws (not shown), selectively rotatable in co-rotation and counterrotation modes.

The materials from which the polymer PTC element is compounded are fed into the compounding extruder 10, in predetermined proportions, and at predetermined feed rates, from a first gravimetric feeder 12 and a second gravimetric feeder 14, which may be of either the single screw or the twin screw type (depending on the materials employed), both types being conventional, commercially-available devices. In a preferred embodiment of the invention, a suitable polymer, such as high density polyethylene (HDPE) or polyvinylidene difluoride (PVDF), is fed, in commercially-available pelletized or powdered form, into the first (preferably single screw) feeder 12, while carbon black is fed into the second (preferably twin screw) feeder 14. The particular types of the constituent materials, and their proportions, depend upon the electrical and physical specifications of the devices to be manufactured, as exemplified by the compositions disclosed in the above-mentioned prior art references. Specific examples of other conductive polymer materials compounded from other polymers and conductive fillers, as well as other fillers, antioxidants, and cross-linking agents, are disclosed in U.S. Pat. No. 4,237,441 van Konynenburg et al., and U.S. Pat. No. 5,174,924 Yamada et al. The compounded conductive polymer formulations disclosed in these patents (as well as other formulations) may be readily employed in the subject invention, with a separate gravimetric feeder for each constituent material.

The action of the compounding extruder 10 melts the polymer pellets and thoroughly mixes and disperses the polymer material with the carbon black to produce a homogeneous compounded conductive polymer melt (preferably about 35% to 50% carbon black by volume, although a volumetric range of carbon black content of about 20% to 70% may be employed) that is discharged at relatively low pressure into the intake of a gear pump 16. The gear pump 16 is of the positive displacement type, specifically designed for polymer extrusion. A suitable gear pump 16 is the "ZENITH PEP-II" pump, of appropriate capacity (e.g., approximately 10 cc per revolution, in the preferred embodiment of the invention). The purpose of the gear pump 16 is to allow the extruder 10 to discharge the melted conductive polymer extrudate at relatively low pressure, thereby minimizing or avoiding the introduction of unnecessary shear forces and work into the material. The gear pump 16, in turn, generates a substantially constant volumetric flow of extrudate at sufficient pressure for input into a "flex-lip" sheet die 18.

The sheet die 18, which is also a conventional, commercially available apparatus, forms the compounded extrudate into a continuous sheet or web 20 of precisely-controlled thickness. When thus formed, the compounded polymer is still in the melt phase. In a preferred embodiment of the invention, the web 20 has a width of about 200 mm, and a thickness of between about 0.20 to about 1.0 mm, depending on the specifications of the component to be manufactured, with widths of up to about one meter and thicknesses of up to about 5 mm being achievable, if desired. The thickness is maintained within a tolerance of between about ±1% to about +5% by a closed loop feed-back control system, as will be described below.

After exiting from the sheet die 18, the web 20 is fed into a lamination mechanism 22, having cooled to a temperature slightly below the melting point of the compounded polymer material. The lamination mechanism comprises a first foil feed reel or payoff reel 24 and a second foil feed reel or pay-off reel 26, which respectively contain first and second continuous sheets or webs 28, 30 of conductive metal foil (preferably nickel-plated copper, although solid copper, nickel, aluminum, and other metals may be used) having a thickness of about 0.025 mm, and having approximately the same width as the web 20 of compounded polymer. As the foil webs 28, 30 are unwound from their respective pay-off reels 24, 26, they are respectively passed through first and second foil pre-heaters 32, 34. The pre-heaters 32, 34 respectively heat the foil webs 28, 30 to a temperature slightly above the melting point of the compounded polymer web 20. Preferably, the pre-heaters 32, 34 are of the hot air type, of conventional design.

After leaving the sheet die 18, the compounded polymer web 20 is passed between a pair of lamination rollers 36, which are heated to approximately the temperature of the compounded polymer web 20. After pre-heating, the foil webs 28, 30 are likewise passed between the lamination rollers 36, such that the first foil web 28 is laminated onto the top surface of the compounded polymer web 20, and the second foil web 30 is laminated onto the bottom surface of the compounded polymer web 20 by the pressure applied by the rollers 36. The result is a continuous three-layer web 38 (FIG. 2), with a compounded polymer layer 40 sandwiched between an upper foil layer 41 and a lower foil layer 42. The laminated web 38 may be passed through an optional thickness gauge 44, of any of several conventional designs, producing an output signal that is indicative of the web thickness, and that may be fed into a microprocessor used in the control of the process, as described below.

Figure 4:
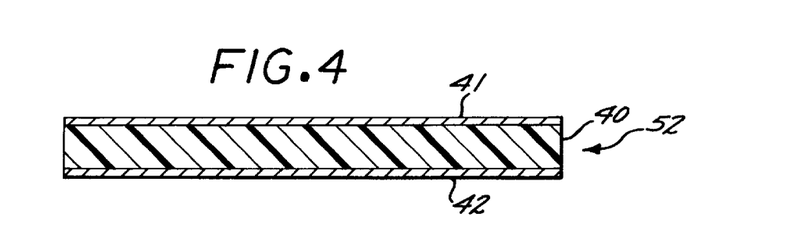
FIG. 4 is a cross-sectional view of a conductive polymer device constructed in accordance with the method of the present invention.

The laminated web 38 is exposed to the atmosphere for a short period of time, allowing it to cool to below the melting point of the compounded polymer. The cooled laminated web 38 may optionally be fed into a "guillotine"-type cutter mechanism 46, of conventional design, which cuts it into sheets 48 of measured. length (e.g., about 300 to about 450 mm). The cutter mechanism 46 then discharges the cut sheets 48 onto a conveyor 50 for stacking, prior to the final step of stamping or punching out the individual polymer PTC components. Alternatively, the continuous laminated web 38 may be re-wound into a roll (not shown), and then unwound for performing the punching/stamping step. A typical polymer PTC component 52, manufactured in accordance with the above-described process, is shown in cross-section in FIG. 4.

Figure 5:
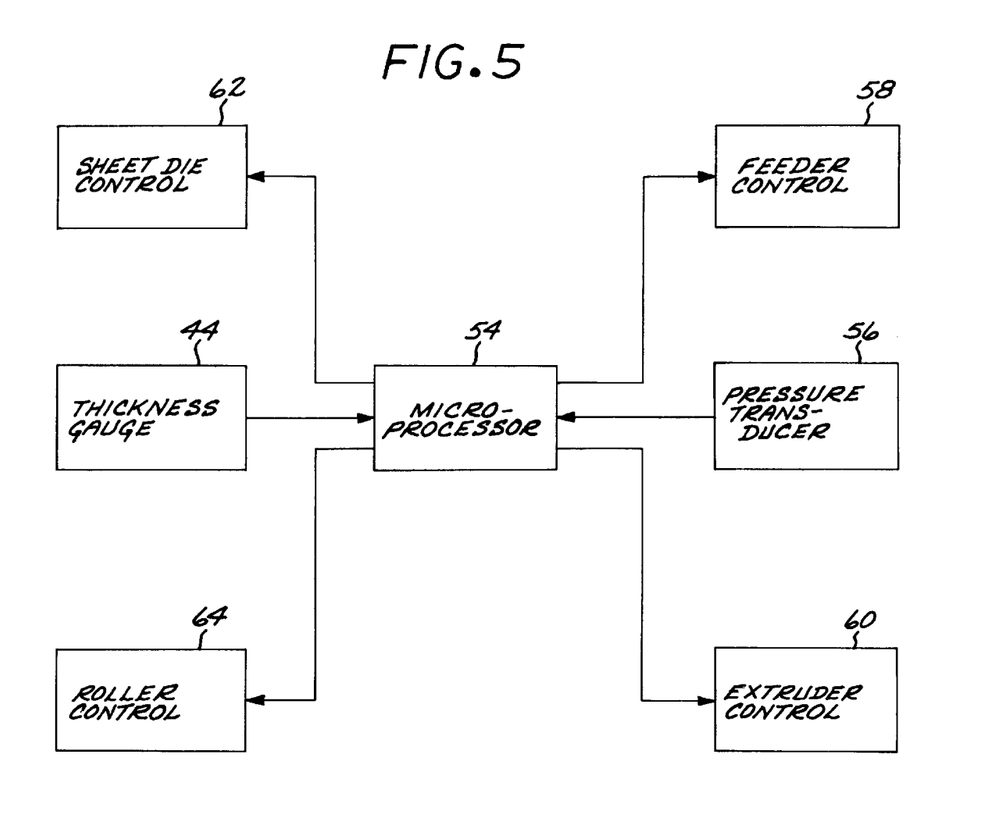
FIG. 5 is a schematic diagram of the control system used in the present invention.

As mentioned above, the above-described manufacturing process is controlled by a closed loop feedback control system, under the control of a microprocessor 54, as shown in FIG. 5. The algorithm used by the microprocessor uses the inlet pressure of the gear pump 16 as the controlling parameter, with a predetermined inlet pressure as the set point. Thus, by means of a pressure transducer 56 at the pump inlet, the pump inlet pressure is measured, and a measured pressure signal is fed to the microprocessor 54. The microprocessor 54 then periodically compares the value of the measured pressure signal with a stored nominal or set point pressure value. The comparison yields a pressure difference signal that is fed to a feeder control mechanism 58 and an extruder control mechanism 60 respectively to control the feed rates of the gravimetric feeders 12, 14, and the rotation rate of the screws in the twin screw extruder 10 in such a manner as to minimize the absolute value of the pressure difference signal. (The feeder control mechanism 58 and the extruder control mechanism 60 are conventional electromechanical control mechanisms that well-known to those of ordinary skill in the pertinent arts.) The algorithm compensates for the residence time (typically about 30 to 180 seconds) of the compounded polymer within the extruder 10. Since the pump inlet pressure is a function of the feed rates and extruder screw rotation rate, the pump inlet pressure can be maintained at or very close to the set point pressure by controlling the feed rates and the extruder screw rotation rate. With these parameters thus controlled, consistency in the compounded polymer material can be maintained to within close tolerances.

If a thickness gauge 44 is used, as described above, another closed loop feedback system may be employed to maintain the thickness of the laminated web 38 to within close tolerances. The thickness control system employs a measured thickness signal generated by the thickness gauge 44 and fed to the microprocessor 54. The microprocessor contains an algorithm that compares the value of the measured thickness signal to a stored set point or nominal thickness value. This comparison yields a thickness difference signal that is fed to a sheet die control mechanism 62 to control the outlet gap of the sheet die 18. Also, the thickness difference signal may be fed to a roller control mechanism 64 to control the pressure applied by the lamination rollers 36 in laminating the foil webs 28, 30 to the compounded polymer web 20 (by controlling the gap width between the rollers 36), and/or the speed at which the rollers 36 draw the material down from the sheet die 18. At least one of these operational parameters (i.e., the sheet die outlet gap, the roller pressure, and/or the roller draw down speed) is controlled so as to minimize the absolute value of the thickness difference signal. (The sheet die control mechanism 62 and the roller control mechanism 64 are conventional electromechanical control mechanisms that well-known to those of ordinary skill in the pertinent arts.) The thickness of the laminated web 38 is thus a function of (a) the outlet gap width of the sheet die 18; (b) the pressure applied by the lamination rollers 36; and (c) the draw down speed of the rollers 36. Therefore, control of one or more of these parameters yields precise control of the thickness of the laminated web 38.

It will be appreciated from the foregoing description that the present invention, by avoiding or minimizing the above-described shortcomings of batch processing methods, provides substantially improved uniformity, consistency, and predictability in the electrical and physical characteristics of the conductive polymer material, and, consequently, of the electrical devices formed from such material. Furthermore, these advantages are achieved while maintaining manufacturing costs acceptably low.

While a preferred embodiment of both the process and apparatus of the present invention has been described herein, it will be appreciated that a number of modifications and variations, some of which have been mentioned above, will suggest themselves to those skilled in the pertinent arts. These and other modifications and variations that may suggest themselves are considered to be within the spirit and scope of the present invention, as defined in the claims that follow.

What is claimed is:

1. Apparatus for manufacturing an article of manufacture comprising a conductive polymer layer laminated between first and second metallic layers, the apparatus comprising:

a compounding extruder mechanism for making a conductive polymer extrudate in the melt phase from a polymer material and a conductive filler material and for discharging the extrudate at a first pressure and at a controllable extrusion rate, the first pressure being at least partly determined by the extrusion rate;

a feed mechanism for separately and controllably feeding the polymer material and the conductive filler material to the compounding extruder mechanism in predetermined proportions at controllable feed rates;

a die mechanism for forming the extrudate into a continuous conductive polymer web having top and bottom surfaces;

a laminating mechanism for laminating a first continuous metallic foil web onto the top surface of the polymer web and a second metallic foil web onto the bottom surface of the polymer web, thereby forming a continuous laminated web having a polymer layer laminated between first and second metallic layers; and a pressure control system, responsive to the first pressure, that maintains the first pressure substantially equal to a predetermined set point pressure value, the pressure control system comprising:

a pressure transducer that measures the first pressure and that generates a measured pressure signal having a value indicative of the first pressure;

a microprocessor that is responsive to the measured pressure signal by periodically comparing the value thereof with the set point pressure value, and that generates a pressure difference signal having a value that is proportional to the difference between the value of the measured pressure signal and the set point pressure value; and a pressure control mechanism, operable on the feed mechanism and the extruder mechanism, that responds to the pressure difference signal by controlling the feed rates and the extrusion rate so as to minimize the absolute value of the pressure difference signal.

2. The apparatus of claim 1, wherein the compounding extruder mechanism discharges the extrudate at a first pressure, and wherein the apparatus further comprises:

a pump fluidly connected between the compounding extruder mechanism and the die mechanism for feeding the extrudate to the die mechanism at a second pressure that is higher than the first pressure.

3. The apparatus of claim 1, wherein the compounding extruder mechanism comprises a twin screw compounding extruder.

4. The apparatus of claim 1, further comprising:

a thickness control system, responsive to the thickness of the laminated web, for maintaining the thickness of the laminated web substantially at a predetermined set point thickness.

5. The apparatus of claim 4, wherein the die mechanism is controllable to vary the thickness of the polymer web, and wherein the thickness control system comprises:

a thickness gauge disposed so as to measure the thickness of the laminated web and to generate a measured thickness signal having a value indicative of the measured thickness thereof;

a microprocessor that is responsive to the measured thickness signal by periodically comparing the value thereof with the set point thickness value, and that generates a thickness difference signal having a value that is proportional to the difference between the value of the measured thickness signal and the set point thickness value; and a thickness control mechanism, operable on the die mechanism, that responds to the thickness difference signal by controlling the die mechanism so as to minimize the absolute value of the thickness difference signal.

6. The apparatus of claim 4, wherein the laminating mechanism is controllable to vary the thickness of the laminated web, and wherein the thickness control system comprises:

a thickness gauge disposed so as to measure the thickness of the laminated web and to generate a measured thickness signal having a value indicative of the measured thickness thereof;

a microprocessor that is responsive to the measured thickness signal by periodically comparing the value thereof with the set point thickness value, and that generates a thickness difference signal having a value that is proportional to the difference between the value of the measured thickness signal and the set point thickness value; and a thickness control mechanism, operable on the laminating mechanism, that responds to the thickness difference signal by controlling the laminating mechanism so as to minimize the absolute value of the thickness difference signal.

7. Apparatus for manufacturing an article of manufacture comprising a conductive polymer layer laminated between first and second metallic layers, the apparatus comprising:

a compounding extruder mechanism for making a conductive polymer extrudate in the melt phase from a polymer material and a conductive filler material;

a feed mechanism for separately and controllably feeding the polymer material and the conductive filler material to the compounding extruder mechanism in predetermined proportions;

a die mechanism for forming the extrudate into a continuous conductive polymer web having top and bottom surfaces;

a laminating mechanism for laminating a first continuous metallic foil web onto the top surface of the polymer web and a second metallic foil web onto the bottom surface of the polymer web, thereby forming a continuous laminated web having a polymer layer laminated between first and second metallic layers, the laminating mechanism being controllable to vary the thickness web; and a thickness control system, responsive to the thickness of the laminated web, for maintaining the thickness of the laminated web substantially at a predetermined set point thickness, the thickness control system comprising:

a thickness gauge that measures the thickness of the laminated of the laminated web and that generates a measured thickness signal having a value indicative of the measured thickness thereof;

a microprocessor that is responsive to the measured thickness signal by periodically comparing the value thereof with the set point thickness value, and that generates a thickness difference signal having a value that is proportional to the difference between the value of the measured thickness signal and the set point thickness value; and a thickness control mechanism, operable on the laminating mechanism, that responds to the thickness difference signal by controlling the laminating mechanism so as to minimize the absolute value of the thickness difference signal.

8. The apparatus of claim 7, wherein the compounding extruder mechanism discharges the extrudate at a first pressure, the apparatus further comprising:

a pressure control system, responsive to the first pressure, that maintains the first pressure substantially equal to a predetermined set point pressure value.

9. The apparatus of claim 8, wherein the feed mechanism is operable to feed the polymer material and the filler material at controllable feed rates and the compounding extruder mechanism is operable to discharge the extrudate at a controllable extrusion rate, the first pressure being at least partly determined by the extrusion rate, and wherein the pressure control system comprises:

a pressure transducer disposed so as to measure the first pressure and to generate a measured pressure signal having a value indicative of the first pressure;

a microprocessor that is responsive to the measured pressure signal by periodically comparing the value thereof with the set point pressure value, and that generates a pressure difference signal having a value that is proportional to the difference between the value of the measured pressure signal and the set point pressure value; and a pressure control mechanism, operable on the feed mechanism and the compounding extruder mechanism, that responds to the pressure difference signal by controlling the feed rates and the extrusion rate so as to minimize the absolute value of the pressure difference signal.

10. Apparatus for manufacturing an article of manufacture comprising a conductive polymer layer laminated between first and second metallic layers, the apparatus comprising:

a compounding extruder mechanism for making a conductive polymer extrudate in the melt phase from a polymer material and a conductive filler material and for discharging the extrudate at a first pressure;

a feed mechanism for separately and controllably feeding the polymer material and the conductive filler material to the compounding extruder mechanism in predetermined proportions;

a die mechanism for forming the extrudate into a continuous conductive polymer web having top and bottom surfaces;

a laminating mechanism for laminating a first continuous metallic foil web onto the top surface of the polymer web and a second metallic foil web onto the bottom surface of the polymer web, thereby forming a continuous laminated web having a polymer layer laminated between first and second metallic layers, the laminating mechanism being controllable to vary the thickness of the laminated web;

a pressure control system, responsive to the first pressure, that maintains the first pressure substantially equal to a predetermined set point pressure value; and a thickness control system, responsive to the thickness of the laminated web, for maintaining the thickness of the laminated web substantially at a predetermined set point thickness, the thickness control system comprising:

a thickness gauge that measures the thickness of the laminated of the laminated web and that generates a measured thickness signal having a value indicative of the measured thickness thereof;

a microprocessor that is responsive to the measured thickness signal by periodically comparing the value thereof with the set point thickness value, and that generates a thickness difference signal having a value that is proportional to the difference between the value of the measured thickness signal and the set point thickness value; and a thickness control mechanism, operable on the laminating mechanism, that responds to the thickness difference signal by controlling the laminating mechanism so as to minimize the absolute value of the thickness difference signal.

* * * * *

UNITED STATES PATENT AND TRADEMARK OFFICE
CERTIFICATE OF CORRECTION

PATENT NO. : 5,849,137
DATED : December 15, 1998
INVENTOR(S) : Hogge et al.

It is certified that error appears in the above-identified patent and that said Letters Patent is hereby corrected as shown below:

Column 4, line 67, "+5%" should be --±5%--.

Column 5, line 41, measured. length" should be --measured length--.

Column 8, line 53, delete "of the laminated".

Signed and Sealed this

Twenty-third Day of November, 1999

Attest:

Q. TODD DICKINSON

*Attesting Officer*   *Acting Commissioner of Patents and Trademarks*